United States Patent [19]

Romenesko et al.

[11] Patent Number: 5,508,323
[45] Date of Patent: *Apr. 16, 1996

[54] METHOD FOR IMPARTING FIRE RETARDANCY TO ORGANIC RESINS

[75] Inventors: David J. Romenesko; Robert R. Buch, both of Midland, Mich.

[73] Assignee: Dow Corning Corporation, Midland, Mich.

[*] Notice: The term of this patent shall not extend beyond the expiration date of Pat. No. 5,391,594.

[21] Appl. No.: 321,955

[22] Filed: Oct. 11, 1994

Related U.S. Application Data

[63] Continuation of Ser. No. 906,165, Jun. 29, 1992, Pat. No. 5,391,594.

[51] Int. Cl.$^6$ .......................... C08L 101/00; C08L 23/08
[52] U.S. Cl. .......................... 523/212; 524/500; 524/506; 524/537; 524/538; 524/539; 524/542; 525/100; 525/105; 525/106; 525/104; 525/393; 525/431; 525/452; 525/446; 525/464; 525/474
[58] Field of Search .......................... 523/212; 524/425, 524/500, 506, 537, 538, 539, 542; 525/100, 105, 106, 104, 393, 431, 452, 446, 464, 474

[56] References Cited

U.S. PATENT DOCUMENTS

| | | | |
|---|---|---|---|
| 3,365,517 | 1/1968 | Barth | 260/860 |
| 3,423,479 | 1/1969 | Hendricks | 260/824 |
| 3,737,479 | 6/1973 | Haaf | 525/393 |
| 3,824,208 | 7/1974 | Link | 524/588 |
| 3,920,770 | 11/1975 | Natashio | 260/897 |
| 4,387,176 | 6/1983 | Frye | 524/268 |
| 4,500,659 | 2/1985 | Kroupa et al. | 523/213 |
| 4,536,529 | 8/1985 | Frye | 524/284 |
| 4,548,979 | 10/1985 | Weise | 524/403 |
| 4,663,397 | 5/1987 | Morita | 525/398 |
| 4,761,454 | 8/1988 | Ob et al. | 514/862 |
| 4,764,577 | 8/1988 | Inove et al. | 525/409 |
| 4,778,860 | 10/1988 | Morita et al. | 525/431 |
| 4,880,882 | 11/1989 | Morita et al. | 525/446 |
| 4,888,390 | 12/1989 | Liang | 525/189 |
| 4,898,898 | 2/1990 | Fitzgerald et al. | 523/351 |
| 5,017,637 | 5/1991 | Smith | 524/354 |
| 5,064,887 | 11/1991 | Yamamoto | 324/145 |
| 5,153,238 | 10/1992 | Bilgrien et al. | 523/211 |
| 5,204,395 | 4/1993 | Lupinski | 524/265 |

FOREIGN PATENT DOCUMENTS

| | | |
|---|---|---|
| 393959 | 4/1990 | European Pat. Off. . |
| 193030 | of 0000 | Hungary . |
| 102007 | 10/1988 | Japan . |

*Primary Examiner*—Ralph H. Dean
*Attorney, Agent, or Firm*—Alexander Weitz

[57] ABSTRACT

A free-flowing silicone polymer powder, having an average particle size of 1 to 1000 microns and prepared by mixing a polydiorganosiloxane with a silica filler, is uniformly dispersed in an organic resin using conventional equipment, such as a single screw or, preferably, a twin screw extruder. When employed at a concentration of about 0.5 to 25 parts by weight of powder per 100 parts by weight of resin, a significant improvement in the burn character of the modified resin is obtained such that the rate of heat release, generation of smoke and evolution of toxic carbon monoxide gas is significantly reduced relative to the unmodified resin.

34 Claims, 3 Drawing Sheets

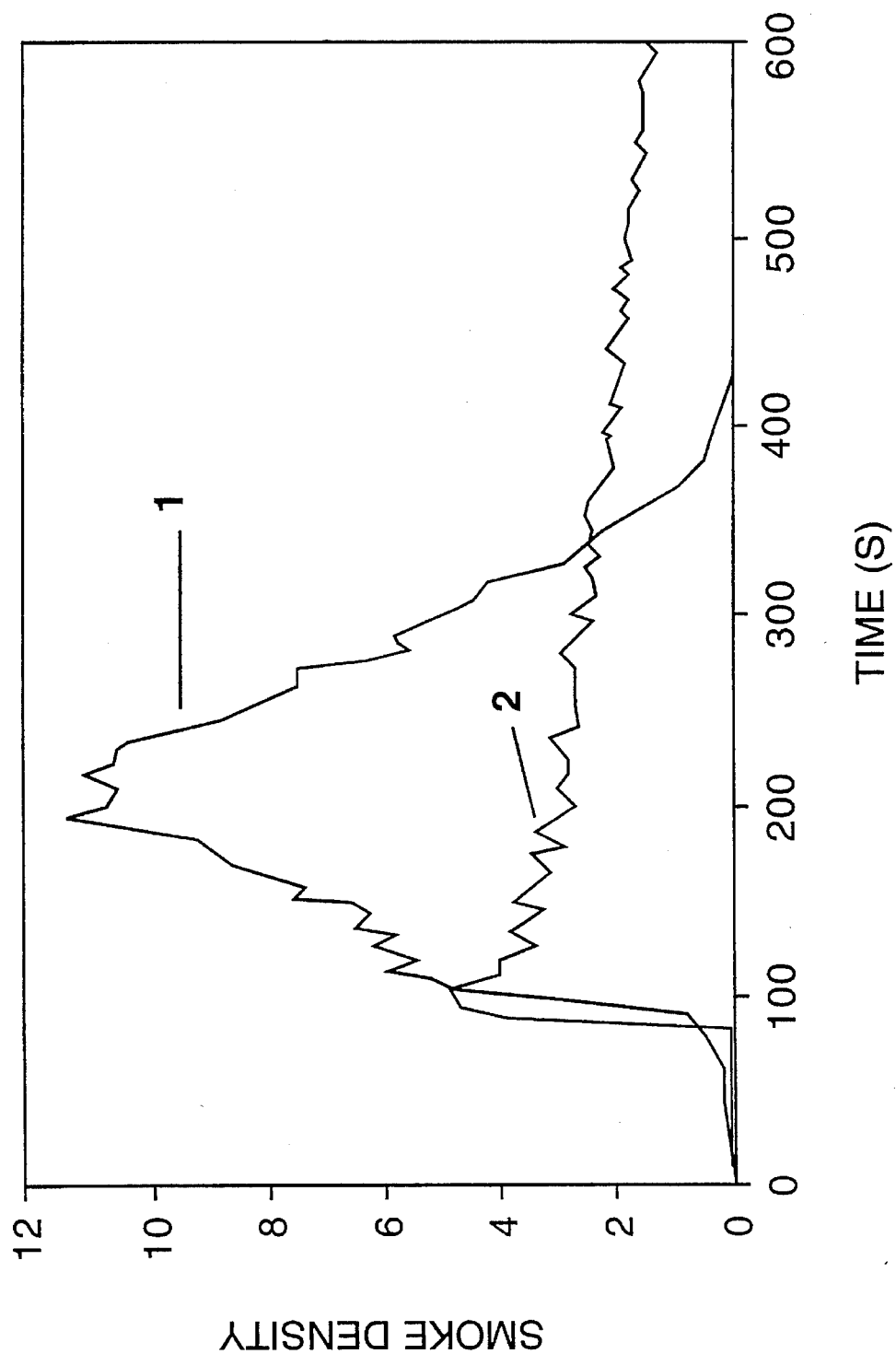

METHOD FOR IMPARTING FIRE RETARDANCY TO ORGANIC RESINS

This is a continuation Ser. No. 07/906,165 filed on Jun. 29, 1992, now U.S. Pat. No. 5,391,594.

FIELD OF THE INVENTION

The present invention relates to a method for imparting fire retardancy to an organic resin. More particularly, the invention relates to a method for reducing the rate of combustion, evolution of carbon monoxide and formation of smoke when a thermoplastic or thermoset resin is burned, said method comprising modifying the resin with a certain silicone polymer powder.

BACKGROUND OF THE INVENTION industrial utilization of plastics, particularly the so-called engineering thermoplastics, has greatly increased over the past several decades. These materials have found their way into such diverse applications as home and office furniture, airplane interiors, cabinetry and casing for electronic and computer systems and various components for automobiles, machines and cookware, inter alia. Some of these plastics, however, are not tough enough for the demanding applications which continue to spring forth from the fertile minds of cost-conscious design engineers. In this regard, considerable effort has been devoted toward the improvement of mechanical properties of the plastics, the enhancement of impact strength being particularly prized. To a limited extent, these difficulties have been overcome by the addition of various rubber compositions to thermoplastic resins.

For example, Liang et al., in U.S. Pat. No. 4,888,390, issued Dec. 19, 1989, showed that certain rubbers could be used to improve the crack and/or impact resistance of a poly(phenylene sulfide) (PPS) resin. In a similar approach, U.S. Pat. No. 3,920,770 to Nakashio et al., issued on Nov. 18, 1975, teaches a poly(phenylene ether) (PPE) resin modified with various rubbery polymers. These compositions have improved elongation and impact resistance relative to unmodified resin.

Designers employing these plastic materials also place a high premium on fire retardancy since accidental fires continue to extract a heavy toll on life and property. Here, the thermoplastic and thermosetting resins are less than satisfactory due to their organic (i.e., inherently combustible) nature. This deficit has also been addressed, most notably by incorporating various halogen or phosphorous fire retardant compounds in the plastic composition. A hydrated metallic compound, such as a hydrated alumina filler can also be used as fire retardant component, either by itself or in combination with the aforesaid compounds. Unfortunately, such tactics present disadvantages of their own: the addition of hydrated fillers can detract from the mechanical properties of the modified plastic while many of the halogen and phosphorous compounds are undesirable from a toxicological perspective. Additionally, even though the halogen compounds do impart flame resistance, their products of combustion are notoriously corrosive. Therefore, sensitive electronic components which have been exposed to the fumes of burned plastics containing such compounds can suffer extensive corrosion damage even though they are otherwise unaffected by the heat of the fire. The deleterious effects can occur months after the incidence of fire and the use of these compounds could foster a false sense of security. There is therefore a need for modified plastic systems which place less reliance on these conventional means of achieving fire retardant properties. Some progress toward this end has been made by modifying plastics with certain silicone components.

Thus, for example, a flame retardant PPE resin composition containing an aromatic alkenyl resin, a polyorganosiloxane graft copolymer, a phosphate and a particulate silicic acid is disclosed in U.S. Pat. No. 5,064,887 to Yamamoto et al., issued on Nov. 12, 1991.

In U.S. Pat. No. 4,387,176, issued on Jun. 7, 1983 to Frye, a thermoplastic flame retardant composition is disclosed which employs a combination of a silicone fluid or gum, a metal organic compound and a silicone resin as the modifier for the thermoplastic. A similar system is shown by Frye et al. in U.S. Pat. No. 4,536,529, issued on Aug. 20, 1985. In the latter patent, the modifying components include a silicone fluid, a metal soap precursor and a silicone resin. These compositions are said to offer simpler processing and improved impact resistance over unmodified thermoplastics.

Smith et al., in U.S. Pat. No. 5,017,637, issued on May 21, 1991, teach a fire-retardant thermoplastic composition comprising an olefinic copolymer or terpolymer, a polyorganosiloxane, a metal oxide hydrate and a dialdehyde. This composition finds utility in molding and extrusion applications.

A flame retardant polymer composition which is essentially free of halogen compounds and organometallic salts is disclosed in European Patent Application 0393959 to BP Chemicals Ltd., published on Oct. 24, 1990. This contribution to the art employs a combination of a silicone fluid or gum and an inorganic filler selected from compounds of a Group IIA metal, to modify certain copolymers of ethylene. The filler is typically a compound such as magnesium oxide, magnesium carbonate or calcium carbonate and the modified polymers are useful in wire and cable applications.

In the elastomer art, it is also known to prepare organosiloxane compositions in the form of a free-flowing powder prepared from a high consistency "gum-type" polydiorganosiloxane and a reinforcing filler. There is, however, no suggestion to combine these with a thermoplastic resin as disclosed herein.

In accordance with the teaching of Link and Scarbel in U.S. Pat. No. 3,824,208, issued Jul. 16, 1974, a powdered material is obtained by first reducing the particle size of the polydiorganosiloxane and then mixing the particles with at least 15 parts by weight of a reinforcing filler at a temperature of from 0° to 100° C. and under particular shear conditions.

Japanese Patent Publication No. 2/102007 to Toshiba Silicone Co., published on Apr. 13, 1990, teaches pelletizing a high consistency or "gel" type vinyl-containing polydiorganosiloxane and then blending the resultant pellets with a filler. A processing aid is included to prevent a phenomenon referred to as "creping" or "crepe hardening." The resultant composition is then mixed using a high speed rotating blade at 10° to 100° C. to produce a free-flowing powder.

Elastomers prepared from silicone rubber powders according to the above cited teachings of Link and Scarbel and Japanese Patent Publication No. 2/102007 were found to have a number of shortcomings, such as the presence of undesirable gel particles which are discernable to the unaided eye as clear spots when the powdered rubber is combined with a suitable dye and massed into a thin section. This gel problem was essentially overcome by the discoveries of Bilgrien et al., as disclosed in a application for patent entitled "Storage Stable Organosiloxane Composition and Method for Preparing Same," Ser. No. 790,043, filed on Nov. 12, 1991, now U.S. Pat. No. 5,153,238, assigned to the assignee of the present invention and hereby incorporated by reference. The silicone rubber powder compositions of Bilgrien et al. have an average particle size of 1 to 1000 microns and are prepared by blending a high consistency polydiorganosiloxane into a quantity of fluidized reinforcing filler that is heated to a temperature of >100° C. to 200° C. prior to, or immediately following, introduction of the polydiorganosiloxane. The resultant rubber powders additionally exhibit excellent storage stability and can be subsequently massed and cured to yield substantially gel-free elastomers having excellent physical properties.

The particular silicone rubber powder prepared according to the disclosure of Bilgrien et al., cited supra, was found to be useful as a modifier for PPE resins and provided unexpected improvements in impact resistance and processability for only these polymers. This discovery was disclosed by Romenesko et al. in copending application for patent entitled "Poly(phenylene ether) Resin Modified with Silicone Rubber Powder," Ser. No. 793,877, filed on Nov. 18, 1991 and assigned to the assignee of the present invention.

All of the above mentioned improvements in the modification of plastic resins notwithstanding, there is still a need for plastic materials having a greater degree of fire retardancy. Moreover, recent trends in the art suggest that widely-accepted test methods used to evaluate the fire retardant character of plastics are not predictive of their real life fire hazard. Conventional tests, such as Limited Oxygen index (LOI), which is a measure of the minimum oxygen content of the atmosphere capable of sustaining combustion of the sample, and Underwriters Laboratory method UL-94, wherein certain burn properties of a vertical or horizontal test piece are determined-(described in greater detail infra), only provide gross measures of flame resistance. The latter test is the industry's method of choice and various modifying agents discussed above are typically added to plastics in order to pass this test.

However, neither of the above methods offers specific information about the rate of heat generation in a fire; nor do these tests provide information about the rate of smoke generation or the production of toxic gases as the samples are burned. It has been well documented that these are the predominant elements responsible for death and injury in a real fire situation. Thus, although the conventional tests may be well established and easy to carry out, they are not good indicators of the actual liability associated with the burning of a given material since they do not measure the above mentioned elements of the combustion process.

A more promising evaluation of the critical parameters (rate of combustion and the evolution of smoke and carbon monoxide) has recently been developed. This method, which has been codified as American Society for Testing and Materials standard ASTM E 1354-90, plays a key role in the instant invention and is described in greater detail below. It employs a so-called cone calorimeter to obtain a quantitative display of the above mentioned combustion elements as a function of burn time. Using this method, the skilled artisan can quickly predict the relative combustion hazard of a given new plastic formulation.

SUMMARY OF THE INVENTION

It has now been discovered that silicone rubber powders of the general type disclosed in above cited patent applications to Bilgrien et al. and Romenesko et al. can be used to modify resins other than poly(phenylene ether). When burned in a cone calorimeter, the thermoplastic or thermosetting resin compositions modified with this silicone rubber powder unexpectedly exhibit significantly lower rates of heat generation and reduced smoke and carbon monoxide formation than the unmodified controls. Moreover, this improved flame retardant character can be achieved without resorting to the addition of the undesirable halogen, phosphorous or hydrate compounds. Additionally, the silicone rubber powders are readily dispersible in the various resins using conventional process equipment, such as a single screw or, preferably, a twin screw extruder. This offers a significant advantage to a plastics manufacturer since both resin and modifying rubber ingredients can be handled as free-flowing solid feeds and are therefore amenable to facile introduction to mixing equipment (e.g., from a hopper).

The present invention therefore relates to a method for imparting fire retardancy to an organic resin selected from the group consisting of organic thermoplastic resins, said method comprising thoroughly dispersing a silicone polymer powder in said resin to form a modified resin composition, which, when burned, has a reduced rate of combustion and a reduced evolution of carbon monoxide and smoke relative to the unmodified resin, said silicone polymer powder having an average particle size of 1 to 1000 microns and consisting essentially of
  (i) 100 parts by weight of a polydiorganosiloxane fluid or gum, and
  (ii) from 10 to 150 parts by weight of a silica filler.

BRIEF DESCRIPTION OF THE DRAWINGS

FIG. 3 represents results of cone calorimeter tests on the polystyrene samples of FIG. 1 showing smoke evolution as a function of burn time.

DETAILED DESCRIPTION OF THE INVENTION

Figure 1:
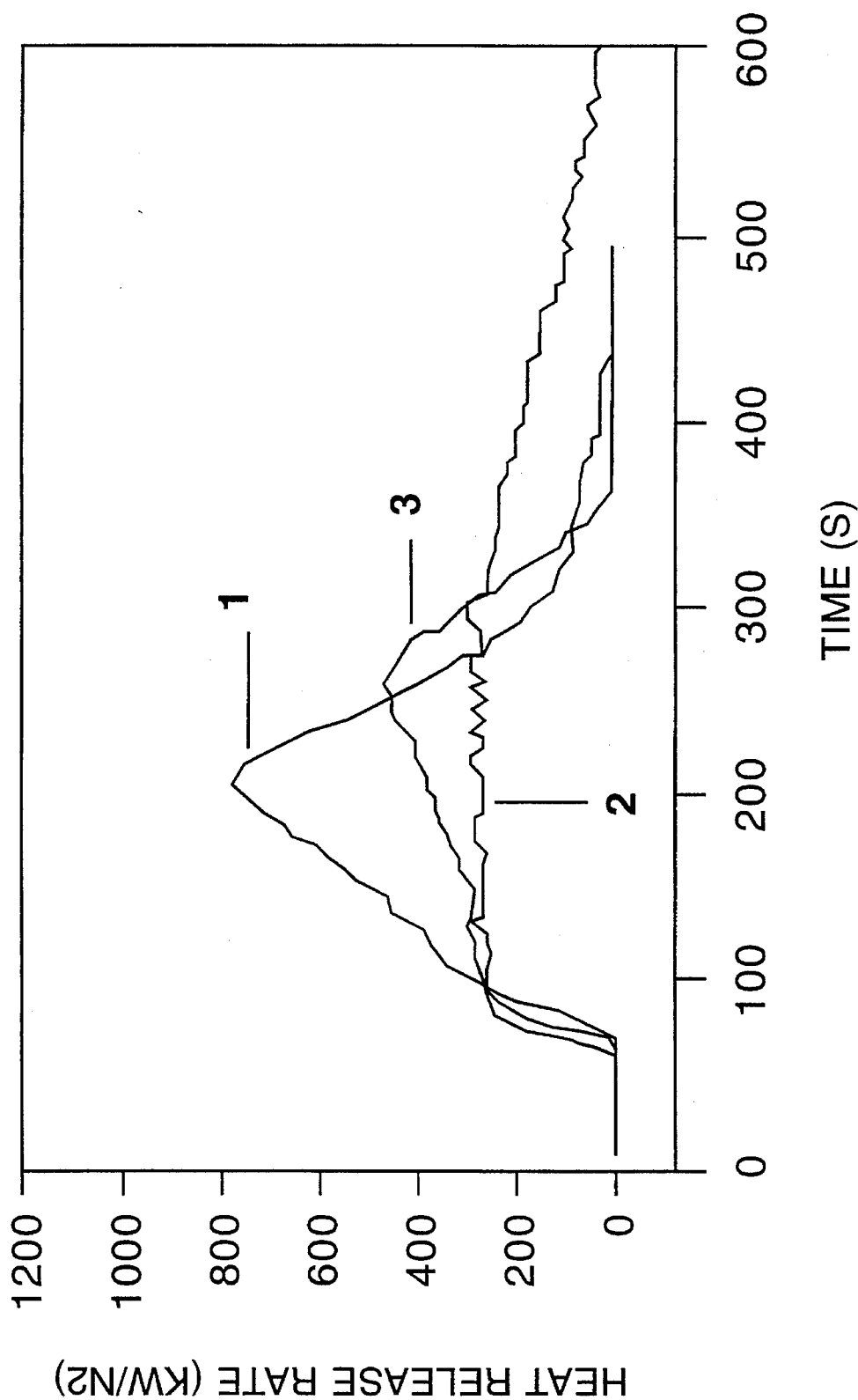
FIG. 1 represents results of cone calorimeter tests on polystyrene samples showing heat release as a function of burn time.

The thermoplastic or thermosetting resin (A) of the present invention is well known in the art and may be a homopolymer or copolymer of any such conventional system. Preferably, this component is a thermoplastic selected from polystyrene, high impact polystyrene, polypropylene, polycarbonate or poly(phenylene ether). Examples of other thermoplastics which may be modified according to the present invention are polysulfones, poly(phenylene sulfide), acrylonitrile-butadiene-styrene copolymers, nylons, acetal, polyethylene and copolymers thereof, poly(ethylene terephthalate), poly(butylene terephthalate), acrylics, fluoroplastics, thermoplastic polyesters, inter alia.

Examples of thermosetting resins which can be modified with the silicone polymer powders of the invention include such systems as phenolics, epoxies, urethanes, unsaturated polyesters, polyimides, melamine formaldehyde and urea.

Component (B) of the present invention is a silicone polymer powder which consists essentially of 100 parts by weight of one or more polydiorganosiloxanes (i) blended with about 10 to about 150 parts by weight of silica filler (ii).

The polydiorganosiloxane (i) used in the preparation of silicone polymer powder (B) is a fluid or high consistency polymer or copolymer. Preferably, component (i) has the consistency of a gum and contains at least one functional group selected from the group consisting of hydroxyl and vinyl, in its molecule. The molecular weight of this polymer is sufficient to impart a viscosity of from about 100 to about 100,000,000 mPa-s (centipoise) to the polymer at 25° C. An alternate characterization of the viscosity of the polydiorganosiloxane gums utilized in the present invention is the "Williams plasticity number," as determined by the American Society for Testing and Materials (ASTM) test method 926. The plasticity number, as used herein, is defined as the thickness in millimeters×100 of a cylindrical test specimen 2 cm$^3$ in volume and approximately 10 mm in height after the specimen has been subjected to a compressive load of 49 Newtons for three minutes at 25° C. The high consistency polydiorganosiloxanes contemplated herein preferably have a Williams plasticity of about 150 to about 500.

The organic groups of the polydiorganosiloxane (i) are independently selected from hydrocarbon or halogenated hydrocarbon radicals such as alkyl and substituted alkyl radicals containing from 1 to 20 carbon atoms; alkenyl radicals, such as vinyl and 5-hexenyl; cycloalkyl radicals, such as cyclohexyl; and aromatic hydrocarbon radicals, such as phenyl benzyl and tolyl. Preferred organic groups are lower alkyl radicals containing from 1 to 4 carbon atoms, phenyl, and halogen-substituted alkyl such as 3,3,3-trifluoropropyl. Thus, the polydiorganosiloxane can be a homopolymer, a copolymer or a terpolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. Most preferably, component (i) is a polydimethylsiloxane which is terminated with a vinyl group at each end of its molecule and/or contains at least one vinyl group along its main chain.

Methods for preparing fluid or high consistency (gum) polydiorganosiloxanes are sufficiently well known that they do not require a detailed discussion in this specification. For example, a typical method for preparing these polymers comprises the acid- or base-catalyzed polymerization of cyclic diorganosiloxanes.

Component (ii) of the silicone polymer powder (B) is a finely divided filler derived from fume, precipitated or mined forms of silica. The former two fillers are typically characterized by surface areas greater than about 50 m$^2$/gram. The fume form of silica is a preferred reinforcing filler based on its surface area, which can be as high as 900 m$^2$/gram, but preferably has a surface area of 50 to 400 m$^2$/gram. When the less preferred mined silica (e.g., MINU-SIL™) is employed, it should be combined with at least an equal weight of a fume or precipitated silica.

For the purpose of the present invention, the silica filler is preferably treated by reaction with a liquid organosilicon compound containing silanol groups or hydrolyzable precursors of silanol groups. Compounds that can be used as filler treating agents, also referred to as anti-creping agents, include such components as low molecular weight liquid hydroxy- or alkoxy-terminated polydiorganosiloxanes, hexaorganodisiloxanes and hexaorganodisilazanes. The silicon-bonded hydrocarbon radicals in all or a portion of the filler treating agent can contain substituents such as carbon-carbon double bonds. It is preferred that the treating compound is an oligomeric hydroxy-terminated polydimethylsiloxane having an average degree of polymerization (DP) of 2 to about 100. A highly preferred treating fluid of this type has a DP of about 2 to about 10.

The silica filler used in the present method is preferably reacted with about 10 to about 45 weight percent, based on filler weight, of the filler treating agent prior to being blended with the polydiorganosiloxane to form the silicone polymer powder (B). Treatment of the filler can be carried out in the same mixing vessel used to prepare the silicone polymer powder. The silica or other reinforcing filler is typically maintained at a temperature greater than 100° C. to about 200° C. during the treatment process. Alternatively, the filler can be treated while it is being blended with the high consistency polydiorganosiloxane during preparation of the silicone polymer powder. In accordance with a preferred embodiment of the present method, the filler treating agent is sprayed into the mixing chamber during blending of the reinforcing filler with the polydiorganosiloxane, while the filler and polydiorganosiloxane are in the highly turbulent, fluidized state characteristic of the present method.

In highly preferred embodiments of the present invention, an alkoxysilane adhesion promoter (iii) is also incorporated in the silicone polymer powder composition. This alkoxysilane adhesion promoter contains at least one alkoxy group having 1 to 4 carbon atoms and at least one group selected from epoxy, acryloxy, methacryloxy, vinyl, phenyl or N-beta-(N-vinylbenzylamino)ethyl-gamma-aminoalkyl hydrochloride in its molecule. Preferred alkoxysilane adhesion promoters have the general formula

$QSi(OMe)_3$ wherein Me hereinafter denotes a methyl radical and Q is selected from the group consisting of an epoxyalkyl group, an acryloxyalkyl group, a methacryloxyalkyl group, a vinyl group, a phenyl group and an N-beta-(N-vinylbenzylamino)ethyl-gamma-aminoalkyl monohydrogen chloride group. Specific examples of such alkoxysilanes include gamma-acryloxypropyltrimethoxysilane, gamma-methacryloxypropyltrimethoxysilane, gamma-glycidoxypropyltrimethoxysilane, N-beta-(N-vinylbenzylamino)ethyl-gamma-aminopropyltrimethoxysilane monohydrogen chloride, phenyltrimethoxysilane and vinyltrimethoxysilane.

When the alkoxysilane adhesion promoter is employed, it is added at a level of about 0.5 to about 15 parts by weight for each 100 parts by weight of said silicone polymer powder, the addition being preferably carried out after the polydiorganosiloxane and treated silica filler have been mixed, as further described infra.

In addition to the above mentioned components, a number of additional ingredients can be added to the compositions of the present invention. These additional ingredients include but are not limited to extending fillers such as quartz, calcium carbonate, and diatomaceous earth; pigments such as iron oxide and titanium oxide, electrically conducting fillers such as carbon black and finely divided metals, heat stabilizers such as hydrated cerric oxide, flame retardants such as halogenated hydrocarbons, alumina trihydrate, magnesium hydroxide, organophosphorous compounds and other fire retardant (FR) materials.

The silicone polymer powder (B) may be prepared in any mixing apparatus capable of maintaining the reinforcing filler in a fluidized state while blending the filler with the high consistency polydiorganosiloxane and applying sufficient shear to reduce the size of the resultant filler-coated polymer particles to a uniform powder having an average particle size of about 1 to about 1000 microns. Suitable mixers include, but are not limited to, Waring™ blenders having a high speed shearing blade at the bottom of a vertically oriented conical chamber and mixers manufactured by Rheinstahl Henschel AG, Kassel, Germany.

Mixer/granulators manufactured by Littleford Bros. Inc. Florence, Ky. are preferred mixing devices. These mixers are referred to as "plow" or "plowshare" mixers due to the presence of at least one plow or "T"-shaped blade located in a horizontally oriented cylindrical mixing chamber. The plow blade rotates on the horizontal axis of the chamber with the edge of the blade close to the perimeter of the chamber. In addition to maintaining the silica in a fluidized state and uniformly dispersing the polymer particles throughout the silica to achieve a homogeneous blend, the plow blade is also believed to agglomerate the ultimate particles produced by high speed shearing blade(s), also present in the chamber, to achieve the desired final particle size. The speed of the plow blade required to maintain the silica in a fluidized form is typically from 30 to about 200 revolutions per minute, and is dependent upon the capacity of the mixing chamber and the particle size range of the final powder. A speed of from 80 to 180 revolutions per minute is preferred using a 130 liter-capacity mixing chamber. The speed would be proportionately slower for a larger capacity mixer. The mixing chamber also contains at least one high speed chopping blade to provide the shearing force required to reduce the particle size of polydiorganosiloxane to a fine powder. A preferred embodiment of a mixing chamber contains at least one conical array of one to six blades rotating on a single shaft and ranging in diameter from 4 to 9 inches (10 to 23 cm), the smallest diameter blade being located closest to the mixer wall. It is believed that the speed of the chopping blade(s) should be between about 2000 to about 4000 revolutions per minute when it is desired to prepare silicone polymer powders of the present invention with a processing time of up to 30 minutes.

In accordance with the preferred method for preparing the silicone polymer powder (B), at least a portion of the reinforcing filler is maintained in a highly turbulent, fluidized state in the mixing apparatus by stirring or otherwise agitating the filler particles sufficiently to break apart agglomerates, entrap air or other gas between the filler particles and maintain the particles suspended in the mixing chamber. The suspended filler particles assume the characteristics of a fluidized bed with respect to the ability of the suspended filler particles to rapidly coat the particles of polydiorganosiloxane that are added to the mixing apparatus together with or shortly following addition of the filler. The additional ingredients described above can be added to the mixing chamber together with the filler or with the polydiorganosiloxane. However, if the alkoxysilane adhesion promoter (iii) is to be used, this ingredient should be added after the polydiorganosiloxane (i) and silica (ii) have already been mixed.

In accordance with a preferred method, particles of treated silica filler are fluidized and heated to a temperature of greater than 100° C. before the polydiorganosiloxane is added. To avoid or minimize the presence of gel particles and reduce processing time, the temperature within the mixing chamber is maintained at greater than 100° C. to about 200° C., preferably greater than 100° C. to 150° C., during the entire process for preparing the silicone polymer powder (B), which typically requires from 2 to 120 minutes, depending upon the amount of silica.

In a preferred embodiment of the present method and to reduce the capacity of the mixing chamber required to prepare a given amount of the silicone polymer powder, only a portion of the filler is added initially, due to the large increase in filler volume during fluidization. This volume decreases substantially as the silica densifies and coats the polydiorganosiloxane in the mixing chamber. The remaining filler is initially placed in a hopper or other suitable dispensing container and allowed to drop into the chamber as the volume of silica initially present in the mixer decreases due to densification and coating of the polydiorgano-siloxane particles. This method of filler addition utilizes the full volume of the mixing chamber throughout the process of preparing the finely divided organosiloxane composition.

The free-flowing silicone powder compositions prepared using the present method can be stored for extended periods of time at temperatures up to about 60° C. without undergoing any significant change in plasticity of the rubber.

A composition of the present invention may be prepared by thoroughly mixing from about 0.5 to about 25 parts by weight, preferably 1 to 15 parts, of the silicone polymer powder (B) with 100 parts by weight of resin (A). This mixing can be accomplished at elevated temperatures by any of the conventional methods used to disperse various components in high viscosity resins. The temperature and other conditions of such a mixing operation is dependent upon the particular resin selected and may be determined by routine experimentation by those skilled in the art. Alternatively, the silicone polymer powder can be premixed with resin (A) and the mixture then fed to an extruder. Examples of suitable equipment for this purpose include such machines as twin screw extruders and single screw extruders, inter alia.

After components (B) and (A) are thoroughly mixed, the resulting modified resin generally can be further processed by conventional techniques, such as extrusion, vacuum forming, injection molding, blow molding or compression molding, to fabricate plastic parts. When burned, these parts have a reduced rate of heat release and generate less smoke and carbon monoxide than corresponding unmodified molding. Such parts find utility in various industrial applications where a high degree of fire retardancy is desired, particularly wherein the above mentioned elements of combustion pose a threat to human life and/or substantial loss of property. Examples of these applications include window and wall coverings, electrical and electronic insulation components, such as motor, coil and transformer insulation; housings for various electrical and electronic equipment, such as machines computers and hand tools; structural members; furniture; automotive components, such as engine and interior structural components; and aircraft interior components, inter alia.

EXAMPLES

The following examples are presented to further illustrate the method and compositions of this invention, but are not to be construed as limiting the invention, which is delineated in the appended claims. All parts and percentages in the examples are on a weight basis and all measurements were obtained at 25° C., unless indicated to the contrary.

EXAMPLE 1

A silicone rubber powder of the present invention was prepared by first treating a silica filler and then blending the treated filler with a polydimethylsiloxane gum as follows.

The mixing chamber of a 130 liter capacity Littleford Mixer/Granulator (Model FM 130 D; Littleford Bros., Inc., Florence, Ky.) was heated and maintained at a temperature of 135° C. Nitrogen was passed through the mixer chamber at a flow rate of 3.40 $m^3$/sec (120 cubic feet per hour) (CFH). The nitrogen flow rate was then reduced to 0.283 $m^3$/sec (10 CFH) and about half of a 31.95 parts charge of a fume silica having a nominal surface area of 250 $m^2$/gram was added. The chopper and plow blades of the mixer were started (about 160 rpm for plow blade and about 3400 rpm for chopper blades) and 6.80 part of a hydroxy-terminated polydimethylsiloxane fluid having a viscosity of about 0.00004 m²/sec (40 cS) and an average degree of polymerization (DP) of about 8 was sprayed into the mixer chamber using an atomizer nozzle. After about one minute, 59.17 parts of a dimethylvinylsiloxy-terminated polydimethylsiloxane gum containing 0.142 mole percent of methylvinylsiloxane units and exhibiting a Williams plasticity number of about 150 was added to the mixer chamber. The remaining silica was then introduced in addition to 2.07 parts of an organosiloxane copolymer resin containing 7.2 mol percent of $CH_3SiO_{3/2}$ units, 24 mol percent of $(CH_3)_2SiO$ units, 3.2 mol percent of $(CH_3)_3SiO_{1/2}$ units, 15.4 mol percent of $(CH_2=CH)(CH_3)SiO$ units and 50 mol percent of $PhSiO_{3/2}$ units, wherein Ph hereinafter denotes a phenyl radical.

The nitrogen purge rate was increased to 3.40 m³/sec (120 CFH) and the contents were mixed for an additional 20 minutes, after which the mixer was cooled to below 50° C. and a silicone rubber powder having the appearance of a free-flowing fine sugar powder was isolated.

EXAMPLE 2

The procedure of Example 1 was followed with the exception that 1.75 parts of an adhesion promoter, gamma-glycidoxypropyltrimethoxysilane, was added after the 20 minute mixing step. This additional ingredient was mixed at the elevated temperature for about 10 minutes before the above described cooling step was carried out. The resulting silicone rubber powder was a free-flowing "crumbly" powder.

Modification of Polystyrene (PS)

Different silicone materials were used to modify a general purpose polystyrene resin ( STYROOF™ 685D; Dow Chemical Co. ) at additive levels of 5% and 15%. These blends were prepared in a Haake System 90 TW100 extruder (Haake/Fisons Instruments, Paramus, N.J.) wherein the extruder zone 1 was set at 200° C. and zones 2 through 4 were set at 210° C.

Comparative compositions were also used to modify polystyrene resin and are defined as follows:

(Comparative) Example 1 was a trimethylsiloxy-terminated polydimethylsiloxane fluid having a viscosity of about 60 Pa-sec (60,000 cP).

(Comparative) Example 2 was the dimethylvinylsiloxy-terminated polydimethylsiloxane gum containing 0.142 mole percent of methylvinylsiloxane units and exhibiting a Williams plasticity number of about 150 which was used in the preparation of Example 1.

(Comparative) Example 3 was a 2:1 blend of the polydimethylsiloxane gum of (Comparative) Example 2 and a mixture consisting essentially of 82 percent of a dimethylvinylsiloxy endblocked polydimethylsiloxane having a viscosity of about 3 Pa-sec (3,000 cP) and 18 percent of a benzene soluble siloxane resin copolymer consisting essentially of $(CH_3)SiO_{1/2}$ units and $SiO_2$ units n a molar ratio of approximately 0.75:1.

Each of the above blends, having the proportions shown in Table 1, was molded into test bars measuring 12.7×3.2×100 mm. The burn properties of these test bars were evaluated using a cone calorimeter according to the method detailed in American Society for Testing and Materials standard ASTM E 1354-90. In summary, eight of the above described test bars were arranged side-by-side on an aluminum foil tray so as to present a burn surface of approximately 100 mm×100 mm and having a depth of 3.2 mm. The tray containing the sample was placed on the platform of a load cell. A truncated cone heater positioned above the sample was used to irradiate the sample surface at a controlled heat flux of 30 kW/m². Testing commenced with the removal of a heat shield to allow the incident radiant energy to impinge upon the exposed surface of the sample. A spark igniter placed between the cone heater and the sample was used to ignite the gases generated as a result of heating. These gases, as well as the smoke formed during the combustion, were drawn through the cone heater by an exhaust hood, the latter being connected to an exhaust blower through a duct. A gas probe in the duct sampled the combustion gases and was used to continuously monitor the formation of carbon monoxide using an infrared analyzer. Similarly, a helium-neon laser smoke meter within the duct was used to continuously measure the amount of smoke being formed as the sample burned, the smoke density reported herein being a direct indication thereof. The heat released during combustion of the sample was calculated from a continuous determination of the oxygen concentration in the exhaust stream and the flow rate thereof.

Figure 2:
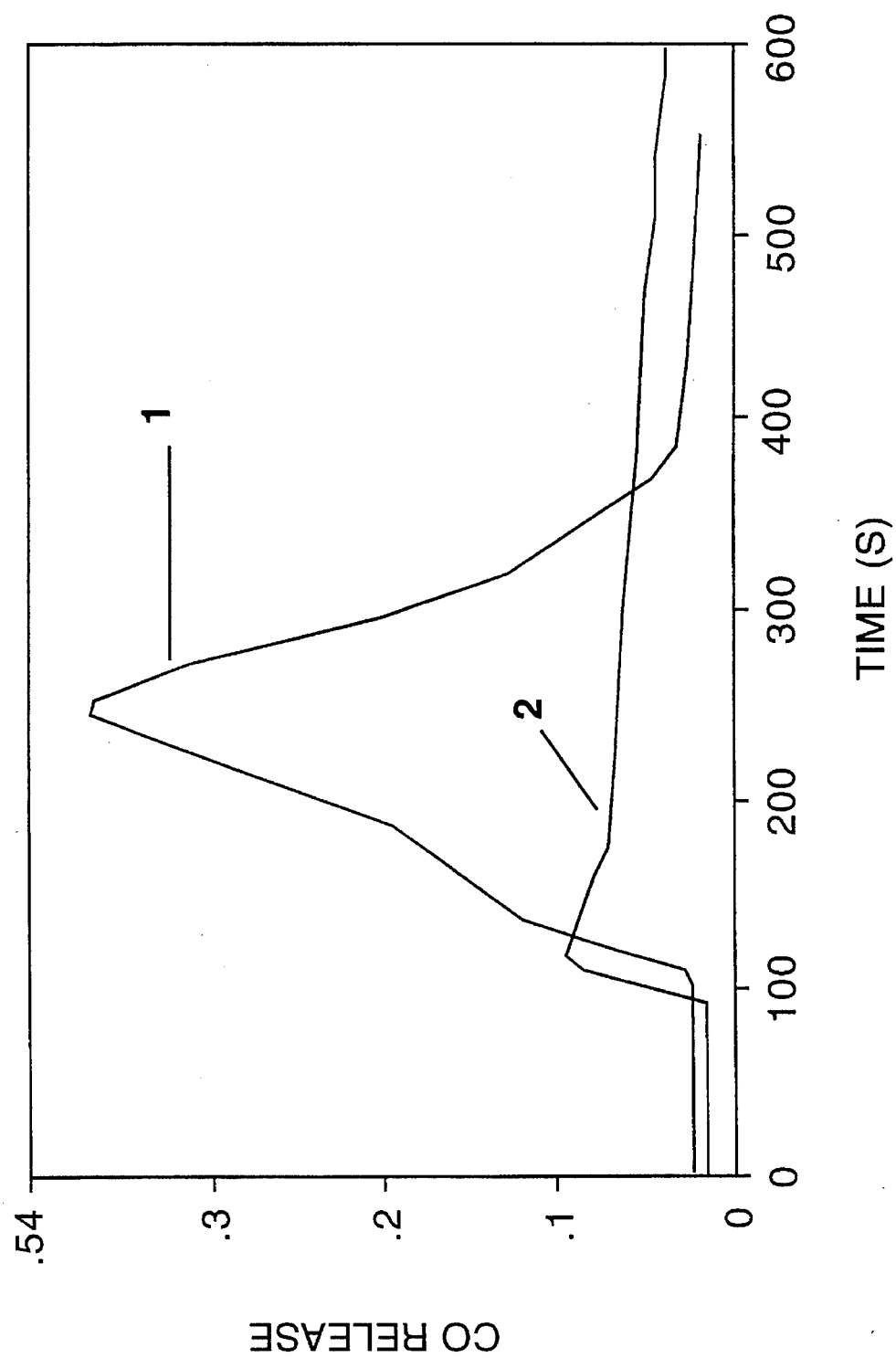
FIG. 2 represents results of cone calorimeter tests on the polystyrene samples of FIG. 1 showing carbon monoxide evolution as a function of burn time.

Representative results of cone calorimeter tests showing heat release, carbon monoxide production and smoke generation as a function of burn time of the polystyrene samples are plotted in FIGS. 1–3, respectively. The ordinate of FIG. 1 represents the heat released at a given time, measured in kW/m². The ordinate of FIG. 2 represents the amount of carbon monoxide released into the exhaust duct stream at a given time, measured in volts (i.e., % CO={volts–0.15}/5) The ordinate of FIG. 3 represents the smoke density in the exhaust duct at a given time, measured in light extinction units. In each of these figures, curve 1 represents the control material (i.e., unmodified PS resin); curve 3 represents the PS resin modified with 15% of the polydimethylsiloxane gum of (Comparative) Example 2; and curve 2 represents the PS resin modified with 5% of the silicone rubber powder of Example 1. Modification of the PS resin with 15% of the silicone rubber powder of Example 1 did not result in a significant change relative to the modification with only 5% thereof and the former results were omitted from the figures for the sake of clarity.

The burn characteristics of the modified PS resins were compared with the unmodified PS, as shown in Table 1. In each case, the value reported is a calculated percentage of the respective property of the particular resin system relative to the peak value attained by the control resin, the former value being taken at the time that the control peak was observed. For example, the relative heat release of the PS resin modified with the silicone rubber powder of Example 1 was calculated by dividing the peak heat release of this sample by the peak heat release of the control.

The relative values for peak heat, carbon monoxide (CO) formation and smoke formation for the above described PS systems are presented in Table 1.

TABLE 1

| Composition | Burn Properties (Percent of Control) | | |
|---|---|---|---|
| | Peak Heat | CO Formed | Smoke Formed |
| Polystyrene Control (0% silicone) | 100 | 100 | 100 |
| Polystyrene Modified with: | | | |
| 15% of (Comparative) Example 1 | 86 | 78 | 94 |
| 15% of (Comparative) Example 2 | 68 | 50 | 87 |
| 15% of (Comparative) Example 3 | 51 | 40 | 57 |

TABLE 1-continued

| Composition | Burn Properties (Percent of Control) | | |
|---|---|---|---|
| | Peak Heat | CO Formed | Smoke Formed |
| 5% of Example 1 | 37 | 21 | 35 |
| 15% of Example 1 | 38 | 22 | 42 |

The results of Table 1 show that the silicone rubber powder of the present invention unexpectedly reduced the peak burn heat, carbon monoxide production and smoke formation relative to unmodified PS compositions, as well as relative to PS modified with similar silicone gum or silicone gum/resin blends.

Modification of Poly(phenylene ether) (PPE)

Three different levels of the silicone rubber powder prepared in Example 2 were blended with a poly(phenylene ether) resin using the above described TW100 extruder to form compositions of the present invention, the relative amounts of silicone and PPE being shown in Table 2. The resin used, HPX-100L, was obtained from Mitsubishi Gas and Chemical, Tokyo, Japan and is described as a poly(2,6-dimethyl-1,4-phenylene ether). The extruder conditions employed were:

Feed zone 1 temperature=280° C.;

Mixing zone 2 temperature=310° C.;

Mixing zone 3 and exit zone 4 temperature=300° C.;

Screw speed=50 revolutions per minute (rpm);

Die=⅛ inch diameter strand die.

The extrudate from the above mixing operation was cooled, chopped into pellets, dried for 2.5 hours at 100° C. and fabricated into test bars measuring 12.7×3.2×100 mm using a Boy model 15S screw-type injection molding machine (Boy Machine Corp., Exton, Pa.). The molding parameters used were:

Mixing zone 1 and 2 temperatures=300° C.

Nozzle zone 3 dial setting=72.

Mold temperature=165° F.

Injection pressure=7,850 psi.

Screw discharge set point=2.0.

Mold clamp pressure=4,300 psi.

Screw speed=100 rpm.

Shot size dial=36.

Mold time=30 seconds.

The burn properties of these test bars were evaluated as described above using the cone calorimeter according to ASTM E 1354-90. Results of the cone calorimeter tests are presented in Table 2, wherein a commercial PPE molding resin (NORYL™ 731) was used as a control, the flame properties of the compositions of the present invention being rated against this control. NORYL™ 731 is a product of the General Electric Co., Pittsfield, Mass., and is believed to be a blend of about 30 to 40 parts of high impact polystyrene (HIPS) in 70 to 60 parts of poly(2,6-dimethyl-1,4-phenylene ether) resin. This was used as a control since processing a 100% PPE sample could not be accomplished without decomposing the polymer.

TABLE 2

| Composition | Burn Properties (Percent of Control) | | |
|---|---|---|---|
| | Peak Heat | CO Formed | Smoke Formed |
| NORYL™ 731 Control (0% silicone) | 100 | 100 | 100 |
| PPE Modified with: | | | |
| 15% of Example 2 | 33 | 30 | 29 |
| 5% of Example 2 | 33 | 30 | 21 |
| 1% of Example 2 | 33 | 26 | 21 |

Modification of Polypropylene (PP)

The powder silicone rubber of Example 2 was used to modify a polypropylene resin (ESCORENE™ 5052; Exxon Chemical Polymers Group, Houston, Tex.) at the levels indicated in Table 3 using the above described blending method.

TABLE 3

| Composition | Burn Properties (Percent of Control) | | |
|---|---|---|---|
| | Peak Heat | CO Formed | Smoke Formed |
| Polypropylene Control (0% silicone) | 100 | 100 | 100 |
| Polypropylene Modified with: | | | |
| 1% of Example 2 | 95.0 | 89.6 | 85.5 |
| 5% of Example 2 | 55.4 | 39.6 | 77.4 |
| 8% of Example 2 | 53.8 | 31.2 | 67.7 |
| 10% of Example 2 | 50.0 | 29.2 | 64.5 |

Modification of Polycarbonate (PC)

The powder silicone rubber of Example 2 was used to modify a polycarbonate resin (CALIBRE™ 0200-13; Dow Plastics, Midland, Mich.) at the levels indicated in Table 4 using the above described blending method.

TABLE 4

| Composition | Burn Properties (Percent of Control) | | |
|---|---|---|---|
| | Peak Heat | CO Formed | Smoke Formed |
| Polycarbonate Control (0% silicone) | 100 | 100 | 100 |
| Polycarbonate Modified with: | | | |
| 1% of Example 2 | 55.2 | 40.9 | 38.5 |
| 5% of Example 2 | 41.4 | 23.3 | 44.4 |

From the above tables it can be seen that the resins modified with the silicone rubber powder according to the present invention generate significantly less heat, carbon monoxide and smoke than the corresponding unmodified resin when each is burned.

Modification of High Impact Polystyrene (HIPS)

To further illustrate the reduced burn resistance of the instant compositions in combination with a conventional flame retardant, the formulations shown in Table 5 were prepared as described for the case of the PS samples. The resin used was STYRON™ 484-27-W high impact polystyrene obtained from the Dow Chemical Co., Midland, Mich. This was tested as a control and also as modified with DECHLORANE™ PLUS 1000 and antimony oxide ($Sb_2O_3$). DECHLORANE™ PLUS 1000 is a product of the Occidental Chemical Corporation (Grand Island, N.Y.) and is a highly chlorinated aromatic flame retardant additive.

Test bars measuring 3.2×12.7×127 mm (⅛×½×5 in) and 1.6×12.7×127 mm (1/16×½×5 inches), respectively, were prepared and subjected to flame resistance testing according to Underwriters Laboratory standard UL-94. In this procedure, the sample is held vertically and ignited with a Bunsen burner (applied for 10 seconds), a cotton swab being placed beneath the sample. The burn characteristics of the material is observed after the burner is removed and these are grouped according to the following classes:

|  | V-0 | V-1 | V-2 |
|---|---|---|---|
| Afterflame time for each individual specimen | ≦10 sec | ≦30 s | ≦30 s |
| Total afterflame time for any condition set of 5 | ≦50 s | ≦250 s | ≦250 s |
| Afterflame plus afterglow time for individual specimen after second flame application | ≦30 s | ≦60 s | ≦60 s |
| Cotton indicator ignited by flaming particles or drops | No | No | No |

Results of burning the above HIPS and modified HIPS samples according to UL-94 is shown in Table 5. This table also shows cone calorimeter results wherein the percentages indicated are relative to a control based on (Comparative) Example 4.

TABLE 5

|  | Control | Example 4 | Example 5 | (Comparative) Example 4 |
|---|---|---|---|---|
| Composition |  |  |  |  |
| HIPS | 100 | 77 | 76 | 78 |
| DECHLORANE ™ PLUS 1000 | — | 18 | 18 | 18 |
| $Sb_2O_3$ | — | 4 | 4 | 4 |
| Example 2 | — | 1 | 2 | — |
| UL-94 Results |  |  |  |  |
| 3.2 mm bars | * | V-1 | V-0 | * |
| 1.6 mm bars | * | V-2 | V-2 | V-2 |
| Cone Calorimeter Results | Burn Properties (Percent of Control) |  |  |  |
| Peak Heat | 66% | 58 | 100 |  |
| CO Formed | 61% | 57 | 100 |  |
| Smoke Formed | 55% | 65 | 100 |  |

* indicates that the sample burned completely in the vertical position and could not be rated by this test.

From Table 5 it can be seen that the compositions of the present invention, further comprising a conventional fire retardant combination, performed as well or better in the UL-94 test than a corresponding composition which did not contain the silicone rubber powder of Example 2.

EXAMPLE 6

A silicone polymer powder based on a polydimethylsiloxane fluid was prepared having the composition:
  (i) 3,876 parts silica having a surface area of 380 $m^2/g$;
  (ii) 4,260 parts dimethylvinylsiloxy endblocked polydimethylsiloxane having a viscosity of about 30 Pa-s;
  (iii) 87 parts hydroxyl endblocked polydimethylsiloxane containing about 10 weight percent vinyl radicals and about 16 weight percent hydroxyl radicals;
  (iv) 1,412 parts hexamethyldisilazane; and
  (v) 180 parts water.

The powder was prepared in a manner similar to that described in Example 1, as follows. A portion of the silica (1,934 parts) was introduced to the mixer and pre-mixed for five minutes. Nitrogen was introduced at a rate of 1.70 $m^3$/sec (60 CFH). Three hundred parts of the hexamethyldisilazane (iv) was then sprayed into the mixer and the system heated for about 20 minutes using 483 kPa (70 psig) steam. The resulting treated silica was discharged from the mixer and the process was repeated for the remaining silica to form a pre-treated silica.

Three thousand parts of the above described pre-treated silica was mixed in the Littleford equipment for five minutes and nitrogen was introduced at 1.70 $m^3$/sec. Polydimethylsiloxane (ii) was then added, followed by the remaining silica. The water and component (iii) were added and then the remaining hexamethydisilazane was sprayed into the mixer. Mixing was continued for about 30 minutes while heating with 483 kPa steam to produce a silicone polymer powder.

The above powder was used to modify the polystyrene resin, as described above, being added at a level of 5% thereto. Results of cone calorimeter tests are presented in Table 6.

TABLE 6

| Composition | Burn Properties (Percent of Control) | | |
|---|---|---|---|
|  | Peak Heat | CO Formed | Smoke Formed |
| Polystyrene Control (0% silicone) | 100 | 100 | 100 |
| Polystyrene Modified with: |  |  |  |
| 5% of Example 6 | 25 | 23 | 37 |

That which is claimed is:

1. A method for imparting fire retardancy to an organic resin selected from the group consisting of organic thermoplastic resins and organic thermoset resins, said method comprising thoroughly dispersing a silicone polymer powder in said resin to form a modified resin composition, said silicone polymer powder having an average particle size of 1 to 1000 microns and consisting essentially of
  (i) 100 parts by weight of a polydiorganosiloxane polymer, and
  (ii) from 10 to 150 parts by weight of a filler selected from the group consisting of silica and treated silica, said powder optionally containing up to 15 parts by weight of an alkoxysilane adhesion promoter for each 100 parts by weight of said silicone polymer powder.

2. The method according to claim 1, wherein component (ii) is a treated silica filler and wherein said modified resin composition, when burned, has a reduced rate of combustion and a reduced evolution of carbon monoxide and smoke relative to the unmodified resin.

3. The method according to claim 2, wherein said organic resin is a thermoplastic resin.

4. The method according to claim 3, wherein said polydiorganosiloxane (i) is a polydimethylsiloxane gum having at least one functional group selected from the group consisting of hydroxyl and vinyl.

5. The method according to claim 4, wherein said treated silica filler (ii) consists essentially of a silica filler having a surface area of 50 to 400 square meters per gram treated with a hydroxy-terminated polydiorganosiloxane having a degree of polymerization of 2 to 100.

6. The method according to claim 4, wherein said silicone polymer powder contains from 0.5 to 15 parts by weight of an alkoxysilane adhesion promoter for each 100 parts by weight of said silicone polymer powder.

7. The method according to claim 6, wherein said treated silica filler (ii) consists essentially of a silica filler having a surface area of 50 to 400 square meters per gram treated with a hydroxy-terminated polydiorganosiloxane having an average degree of polymerization of 2 to 100.

8. The method according to claim 7, wherein said alkoxysilane adhesion promoter is selected from the group consisting of gamma-acryloxypropyltrimethoxysilane, gamma-methacryloxypropyltrimethoxysilane, gamma-glycidoxypropyltrimethoxysilane, N-beta-(N-vinylbenzylamino)ethyl-gamma-aminopropyltrimethoxysilane monohydrogen chloride, phenyltrimethoxysilane and vinyltrimethoxysilane.

9. The method according to claim 8, wherein said hydroxy-terminated polydiorganosiloxane has an average degree of polymerization of 2 to 10.

10. A modified resin composition consisting essentially of:
   (A) 100 parts by weight of an organic resin selected from the group consisting of organic thermoplastic resins and organic thermoset resins; and
   (B) from 0.5 to 25 parts by weight of a silicone polymer powder uniformly dispersed in said resin (A), said silicone polymer powder having an average particle size of 1 to 1000 microns and consisting essentially of
      (i) 100 parts by weight of a polydiorganosiloxane polymer, and
      (ii) from 10 to 150 parts by weight of a filler selected from the group consisting of silica and treated silica, said powder optionally containing up to 15 parts by weight of an alkoxysilane adhesion promoter for each 100 parts by weight of said silicone polymer powder,
said modified composition, when burned, having a reduced rate of combustion and a reduced evolution of carbon monoxide and smoke relative to the unmodified organic resin.

11. The composition according to claim 10, wherein component (ii) is a treated silica filler.

12. The composition according to claim 11, wherein said organic resin (A) is a thermoplastic resin.

13. The composition according to claim 12, wherein said polydiorganosiloxane (i) is a polydimethylsiloxane gum having at least one functional group selected from the group consisting of hydroxyl and vinyl.

14. The composition according to claim 13, wherein said treated silica filler (ii) consists essentially of a silica filler having a surface area of 50 to 400 square meters per gram treated with a hydroxy-terminated polydiorganosiloxane having a degree of polymerization of 2 to 100.

15. The composition according to claim 13, wherein said composition contains from 0.5 to 15 parts by weight of an alkoxysilane adhesion promoter for each 100 parts by weight of said silicone polymer powder.

16. The composition according to claim 15, wherein said treated silica filler (ii) consists essentially of a silica filler having a surface area of 50 to 400 square meters per gram treated with a hydroxy-terminated polydiorganosiloxane having an average degree of polymerization of 2 to 100.

17. The composition according to claim 16, wherein said alkoxysilane adhesion promoter is selected from the group consisting of gamma-acryloxypropyltrimethoxysilane, gamma-methacryloxypropyltrimethoxysilane, gamma-glycidoxypropyltrimethoxysilane, N-beta-(N-vinylbenzylamino)ethyl-gamma-aminopropyltrimethoxysilane monohydrogen chloride, phenyltrimethoxysilane and vinyltrimethoxysilane.

18. The composition according to claim 17, wherein said hydroxy-terminated polydiorganosiloxane has an average degree of polymerization of 2 to 10.

19. A composition according to claim 10 wherein said silicone polymer powder is prepared by mixing
   (i) 100 parts by weight of a polydiorganosiloxane polymer, and
   (ii) 10 to 150 parts by weight of a filler selected from the group consisting of silica and treated silica, said mixing being carried out in a temperature range of greater than 100° C. to 200° C. and under sufficient shear to impart an average particle size of 1 to 1000 microns to said silicone polymer powder, said filler being maintained in a fluidized state during said mixing step, and said powder optionally containing up to 15 parts by weight of an alkoxysilane adhesion promoter for each 100 parts by weight of said silicone polymer powder.

20. The composition according to claim 10, wherein 1 to 15 parts by weight of said silicone polymer powder (B) is combined with 100 parts by weight of said organic resin (A).

21. The composition according to claim 11, wherein 1 to 15 parts by weight of said silicone polymer powder (B) is combined with 100 parts by weight of said organic resin (A).

22. The composition according to claim 12, wherein 1 to 15 parts by weight of said silicone polymer powder (B) is combined with 100 parts by weight of said organic resin (A).

23. The composition according to claim 13, wherein 1 to 15 parts by weight of said silicone polymer powder (B) is combined with 100 parts by weight of said organic resin (A).

24. The composition according to claim 19, wherein component (ii) is a treated silica filler.

25. The composition according to claim 24, wherein said organic resin (A) is a thermoplastic resin.

26. The composition according to claim 25, wherein said polydiorganosiloxane (i) is a polydimethylsiloxane gum having at least one functional group selected from the group consisting of hydroxyl and vinyl.

27. The composition according to claim 26, wherein said treated silica filler (ii) consists essentially of a silica filler having a surface area of 50 to 400 square meters per gram treated with a hydroxy-terminated polydimethylsiloxane having a degree of polymerization of 2 to 100.

28. The composition according to claim 26, wherein said composition contains from 0.5 to 15 parts by weight of an alkoxysilane adhesion promoter for each 100 parts by weight of said silicone polymer powder (B).

29. The composition according to claim 28, wherein said treated silica filler (ii) consists essentially of a silica filler having a surface area of 50 to 400 square meters per gram treated with a hydroxy-terminated polydimethylsiloxane having an average degree of polymerization of 2 to 100.

30. The composition according to claim 29, wherein said alkoxysilane adhesion promoter is selected from the group consisting of gamma-acryloxypropyltrimethoxysilane, gamma-methacryloxypropyltrimethoxysilane, gamma-glycidoxypropyltrimethoxysilane, N-beta-(N-vinylbenzylamino)ethyl-gamma-aminopropyltrimethoxysilane monohydrogen chloride, phenyltrimethoxysilane and vinyltrimethoxysilane.

31. The composition according to claim 30, wherein said hydroxy-terminated polydimethylsiloxane has an average degree of polymerization of 2 to 10.

32. A method for imparting fire retardancy to an inherently combustible organic resin selected from the group consisting of organic thermoplastic resins and organic thermoset resins, said method comprising thoroughly dispersing an inorganic silicone polymer powder in said resin to form a modified resin composition, said inorganic silicone polymer powder having an average particle size of 1 to 1000 microns and consisting essentially of
  (i) 100 parts by weight of a polydiorganosiloxane polymer, and
  (ii) from 10 to 150 parts by weight of a filler selected from the group consisting of silica and treated silica, said powder optionally containing up to 15 parts by weight of an alkoxysilane adhesion promoter for each 100 parts by weight of said silicone polymer powder.

33. A modified resin composition consisting essentially of:
  (A) 100 parts by weight of an inherently combustible organic resin selected from the group consisting of organic thermoplastic resins and organic thermoset resins; and
  (B) from 0.5 to 25 parts by weight of an inorganic silicone polymer powder uniformly dispersed in said resin (A), said inorganic silicone polymer powder having an average particle size of 1 to 1000 microns and consisting essentially of
    (i) 100 parts by weight of a polydiorganosiloxane polymer, and
    (ii) from 10 to 150 parts by weight of a filler selected from the group consisting of silica and treated silica, said powder optionally containing up to 15 parts by weight of an alkoxysilane adhesion promoter for each 100 parts by weight of said silicone polymer powder, said modified composition, when burned, having a reduced rate of combustion and a reduced evolution of carbon monoxide and smoke relative to the unmodified organic resin.

34. A composition according to claim 33, wherein said inorganic silicone polymer powder is prepared by mixing
  (i) 100 parts by weight of a polydiorganosiloxane polymer, and
  (ii) 10 to 150 parts by weight of a filler selected from the group consisting of silica and treated silica, said mixing being carried out in a temperature range of greater than 100° C. to 200° C. and under sufficient shear to impart an average particle size of 1 to 1000 microns to said inorganic silicone polymer powder, said filler being maintained in a fluidized state during said mixing step, and said powder optionally containing up to 15 parts by weight of an alkoxysilane adhesion promoter for each 100 parts by weight of said inorganic silicone polymer powder.

* * * * *